United States Patent

[11] 3,590,798

| [72] | Inventor | Joe E. Goodwin<br>Houston, Tex. |
|---|---|---|
| [21] | Appl. No. | 818,013 |
| [22] | Filed | Apr. 21, 1969 |
| [45] | Patented | July 6, 1971 |
| [73] | Assignee | Sentinel Distributors, Inc.<br>Denver, Colo. |

[54] ENGINE SAFETY DEVICE RESPONSIVE TO ABNORMAL OIL PRESSURE AND COOLANT TEMPERATURE CONDITIONS
3 Claims, 3 Drawing Figs.

| [52] | U.S. Cl. | 123/198 D,<br>123/41.15, 123/97 |
|---|---|---|
| [51] | Int. Cl. | F01m |
| [50] | Field of Search | 123/198 D,<br>97, 97 B, 41.15, 198 |

[56] References Cited
UNITED STATES PATENTS

| 1,473,303 | 11/1923 | Lightford | 123/198 |
|---|---|---|---|
| 1,740,259 | 12/1929 | Morrison | 123/198 |
| 3,202,143 | 8/1965 | Goodwin | 123/198 X |
| 3,379,187 | 4/1968 | Armbrust | 123/198 |

*Primary Examiner*—Wendell E. Burns
*Attorneys*—Cameron, Kerkam and Sutton

ABSTRACT: A safety device for controlling the supply of fuel to a vehicular internal combustion engine, responsive to the occurrence of abnormal oil pressure or coolant temperature conditions in lubricating and cooling systems associated with the engine, has an adjustable, restricted flow bypass around the main fuel valve such that, when the main valve closes automatically due to an emergency condition, sufficient fuel reaches the engine to keep it running at a reduced speed so that the operator retains control of the vehicle.

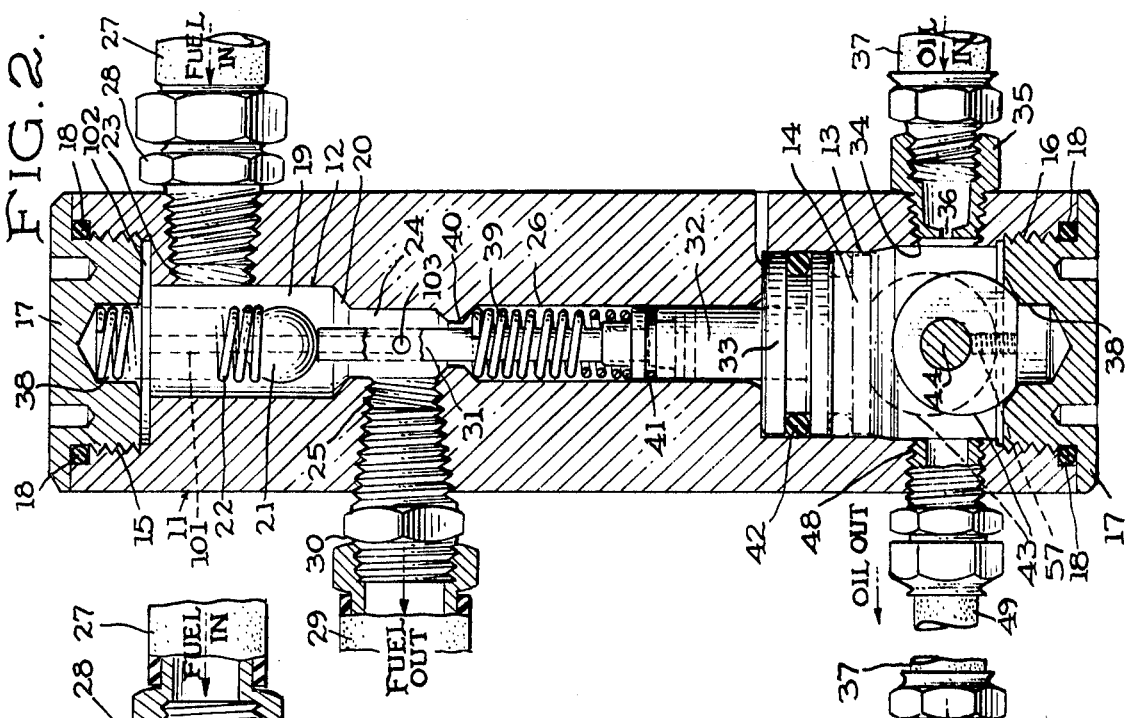
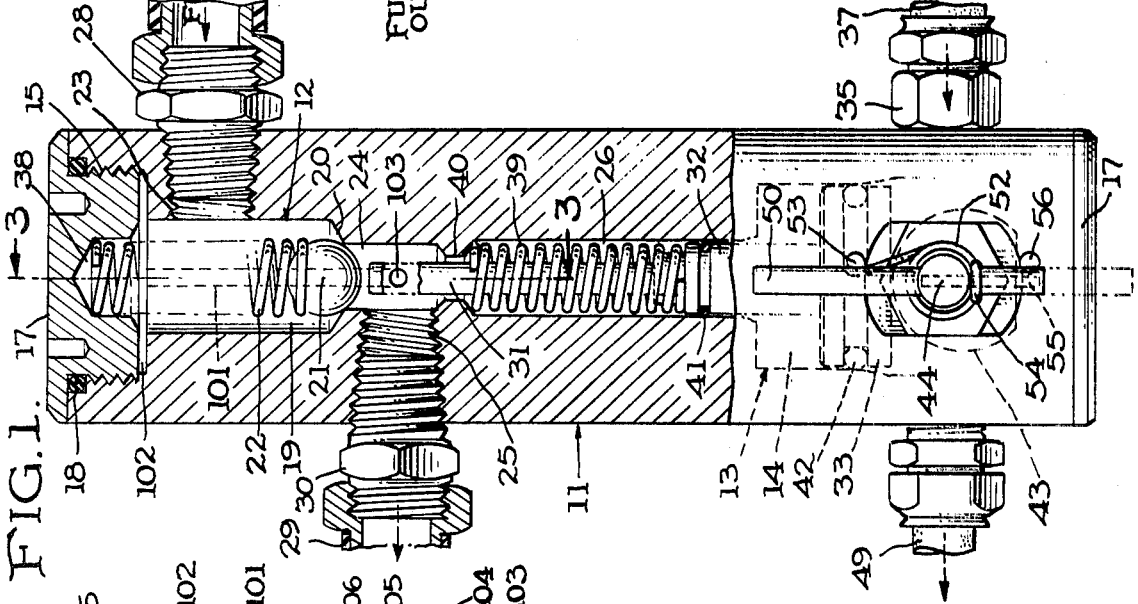
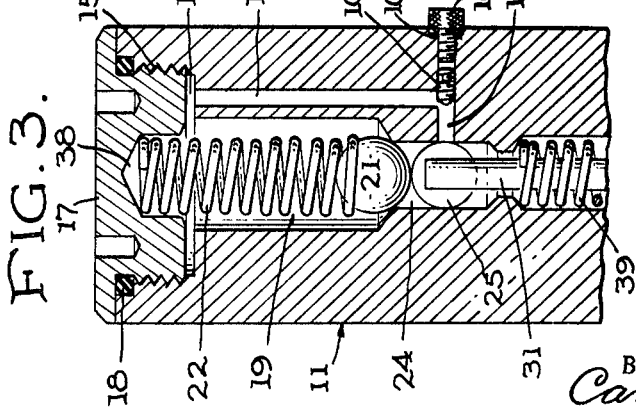
INVENTOR
JOE E. GOODWIN
BY Cameron, Kerkam & Sutton
ATTORNEYS 3,590,798

ENGINE SAFETY DEVICE RESPONSIVE TO ABNORMAL OIL PRESSURE AND COOLANT TEMPERATURE CONDITIONS

BACKGROUND OF THE INVENTION

This invention relates to safety devices for controlling the flow of fuel to internal combustion engines so as to protect an engine or an engine-driven accessory against damage due to insufficient oil pressure in the lubricating system thereof or to overheating, and more particularly to protective apparatus for use with gasoline or diesel engines which drive motor vehicles and marine vessels under such conditions that an automatic, complete shutdown of the engine in response to abnormal pressure or temperature conditions might be dangerous.

There are in the prior art a number of engine protective devices which completely shut off the flow of fuel to the engine in the event of inadequate lubricating oil pressure or overheating, including that disclosed in U.S. Pat. No. 3,202,143, dated Aug. 24, 1965, to which the device of the present invention is directly related. However, if these prior devices are embodied in the fuel supply systems of heavy industrial vehicles, such as trucks, road-building machinery and hauling equipment which require power steering and power brakes and often travel up and down long grades, complete shutdown of the engine deprives the operator of control over the vehicle and may lead to a serious accident.

It is therefore the objective of this invention to improve upon the engine shutdown devices of the prior art, particularly that of U.S. Pat. No. 3,202,143, by providing means which automatically throttle a vehicular engine when abnormal pressure or temperature conditions arise, but without completely shutting down the engine, so that the operator retains control of the vehicle, including its power-steering mechanism and power brakes, and is thereby able to maneuver the vehicle to a safe stopping place where he can shut down the engine completely in the normal manner, and then check for the trouble.

SUMMARY OF THE INVENTION

The present invention resides in a device for controlling the flow of fuel to an internal combustion engine which is an improvement over that of U.S. Pat. No. 3,202,143 in that means are provided for supplying a limited flow of fuel to the engine to enable continued operation thereof at a reduced or idling speed after the main fuel valve has been automatically closed due to a drop in lubricating oil pressure or an excessive increase in coolant temperature. In the preferred embodiment of the invention, the improvement resides in the provision of an internal bypass passageway around the main fuel valve from the fuel intake chamber to the fuel output chamber of the valve assembly, including means for manually varying the amount of fuel which is permitted to flow through the bypass when an emergency occurs and thereby controlling the idling speed of the engine.

BRIEF DESCRIPTION OF THE DRAWING

FIG. 1 is a front view, partially in elevation and partially in vertical cross section, with certain parts partially broken away, of an oil pressure controlled, piston-operated, ball-type liquid fuel valve embodying the invention, the valve being shown in its seated or closed position;

FIG. 2 is a vertical cross-sectional view of the valve of FIG. 1, with certain parts shown in full and partially broken away, showing the valve in fully open position; and FIG. 3 is a fragmentary vertical cross-sectional view, with certain parts shown in full, of the upper portion of the valve shown in FIGS. 1 and 2, taken substantially on the line 3—3 in FIG. 1.

DESCRIPTION OF THE PREFERRED EMBODIMENT

Referring first to FIGS. 1 and 2, the engine protective device there illustrated will be recognized as being an oil pressure-controlled fuel cutoff valve of generally the same construction as that illustrated in FIGS. 1—4 of U.S. Pat. No. 3,202,143, which, for convenience, may be referred to hereinafter as an Oil Sentinel, as it was in the prior patent. As illustrated in FIG. 1 of the patent, when installed on a gasoline or diesel engine, the fuel outlet of the Oil Sentinel is connected to the fuel intake manifold of the engine, while its oil inlet is connected to the pressure side of the oil pump of the engine. Since this form of Oil Sentinel is adapted to be used with a coolant temperature controlled valve, known as Heat Sentinel, the oil outlet of the Oil Sentinel is connected to the oil intake of the Heat Sentinel, and the oil outlet of the latter is connected to the engine sump.

As shown in FIGS. 1 and 2, the Oil Sentinel comprises a cylindrical metallic body 11 which is of very substantial construction and is provided with an axially extending bore of varying diameter. The upper portion 12 of the bore is somewhat longer and of generally smaller diameter than the lower portion 13 which extends to the lower end of body 11 and forms a chamber 14 of relatively large cross section. The upper end of bore portion 12 opens into an enlarged counterbore which is of approximately the same diameter as chamber 14 and is provided with internal threads 15. The lower end of chamber 14 is similarly counterbored and provided with internal threads 16 of the same diameter and pitch as threads 15 so that the two ends of body 11 may be closed by a pair of identical threaded caps 17,17. Each cap 17 is provided with a suitable sealing element 18, such as a rubber or neoprene quad ring.

The upper portion of the bore designated generally at 12 is further subdivided into three interconnecting shorter length chambers. The uppermost one is a combined fuel intake and fuel valve chamber 19 having at its lower end a tapered or conical valve seat 20 adapted to receive a metallic or rubber ball check valve 21 which is yieldably seated thereon by means of a compression spring 22. Valve body 11 is provided adjacent the upper end with a radially extending threaded fuel inlet port 23 communicating with the chamber 19. Disposed immediately below the fuel intake and valve chamber 19 is an intermediate fuel passage and fuel output chamber 24 of less diameter than chamber 19, the body 11 being provided with a radially extending threaded fuel outlet port 25 communicating with the chamber 24. Inlet and outlet ports 23 and 25 are preferably diametrically aligned in a common vertical plane, but offset horizontally as illustrated. A third chamber 26, forming the lower end of bore portion 12 and serving as a piston chamber as described hereinafter, communicates with both the lower portion of chamber 24 and the enlarged chamber 14 at the lower end of the valve body.

The fuel intake chamber 19 is adapted to receive fuel from a fuel supply tank (not shown) through inlet port 23 and a hose or flexible pipe conduit 27 connected thereto by means of an adapter fitting 28. The fuel is discharged from chamber 24 through outlet port 25 by means of a similar conduit or hose 29 and fitting 30 to the carburetor or intake manifold of the engine with which the Oil Sentinel is associated. The flow of fuel from the inlet port 23 to the outlet port 25, through the respective chambers 19 and 24, is controlled primarily by the action of ball valve 21 which is adapted to be moved upwardly to open position by the end portion 31 of an operating piston 32 slidably mounted in the lowermost chamber 26 of bore portion 12 for vertical axial movement therein under the influence of opposing forces as hereinafter described. The ball valve 21 is urged downwardly into closed position on its seat 20 by spring 22 when the piston 32 is at the lower end of its stroke as shown in FIG. 1. The upper end portion 31 of piston 32 is of substantially less diameter than fuel passage chamber 24 so as to permit the free flow of fuel therepast, from the inlet port 23 to the outlet port 25, when the piston is moved upwardly to unseat the ball valve 21.

Connected to the lower end of piston 32 is an enlarged piston head 33 which is slidably mounted in chamber 14 formed by the lower bore portion 13. In order to raise the piston and open valve 21, the lower face of piston head 33 is exposed to the pressure of oil supplied to chamber 14 by the lubricating oil pump of the engine through an inlet port 34 and an orifice fitting 35 having a restricted orifice 35 of substantially less diameter than the oil inlet port 34 and oil supply conduit 37. The restricted orifice fitting 35 serves to effect a sufficient pressure drop within the oil chamber 14 to effect closing of the valve upon operation of the Heat Sentinel as described in U.S. Pat. No. 3,202,143.

Although the oil conduit 37 may be connected in any suitable manner to the forced feed lubricating system of the engine with which the Oil Sentinel is associated, it is also adapted for connection to the lubricating system of an engine-driven accessory, such as a compressor. In the latter event, the oil pressure supplied to chamber 14 will be the same as that existing in the lubricating system of the accessory.

In order to yieldably resist the upward valve-opening movement of the ball valve 21 produced by the oil pressure in chamber 14 and to automatically reclose the valve whenever the oil pressure drops below a predetermined value, the compression spring 22 is provided as aforementioned, having its lower end thrusting against the ball valve 21 and its upper end seated in a recess 38 provided in cap member 17. The force exerted on the ball valve 21 may be adjusted by using springs of different strength.

A second compression spring 39 surrounds the reduced end portion 31 of piston 32, seating at its upper end against a constricted shoulder 40 which divides chambers 24 and 26, and thrusting at its lower end against the operating piston 32. The force exerted on the operating piston 32 may also be adjusted by using springs of different strength. The compression spring 39 serves to positively move the piston 32 downwardly, permitting spring 22 to close the valve, whenever the oil pressure in chamber 14 drops below a predetermined value. Piston 32 and pistonhead 33 are provided with fuel-and-oil resistant quad ring seals 41 and 42, respectively.

It will be apparent from the foregoing description that the fuel valve 21 will be maintained in an elevated position, permitting a free flow of fuel from inlet port 23 through chambers 19 and 24 to outlet port 25, as long as the oil pressure in the lubricating system of the engine (or an associated driven accessory) and in said chamber 14 is maintained at or above the predetermined value established by the combined force of springs 22 and 39.

The Oil Sentinel may also have its fuel valve partially opened manually, as indicated in broken lines in FIG. 2, when the oil pressure in chamber 14 is insufficient to raise the valve to its full open position. Such manually operable means are particularly useful when this safety device is used in conjunction with an engine compressor unit, because it is frequently desirable to run the engine with the compressor disengaged, under which conditions the oil pressure in the lubricating system of the compressor would not hold the ball valve 21 in its open condition and the supply of fuel to the engine would be cut off.

As shown in FIGS. 1 and 2, the manually operable means for opening the fuel valve 21 comprises an eccentric cam 43 mounted in chamber 14 beneath the pistonhead 33 on the inner end of a shaft 44. The shaft 44 extends radially outwardly of the valve body 11 through a bushing which is threaded into said body at a position halfway between oil inlet port 34 and a diametrically opposed oil outlet port 48. Oil outlet port 48 communicates by means of a suitable conduit 49 with the oil inlet side of the above-mentioned Heat Sentinel, as shown in FIG. 1 of U.S. Pat. No. 3,202,143. The cam 43 is attached to the end of shaft 44 by a setscrew 57 in a position such as to lie directly beneath the central portion of piston head 33. Cam 43 is so oriented on shaft 44 that, when the piston 32 is at the lower end of its stroke in valve-closing position, as shown in FIG. 1, the lower face of the pistonhead 33 abuts the low part of the cam.

The outer end of shaft 44 is provided with an operating handle 50 which passes through a diametrically extending opening in the shaft and is fixed therein in any suitable manner, as by a setscrew (not shown). Clockwise rotation of the handle and shaft through an angle of 180° rotates the cam to bring the flattened high part thereof into engagement with the piston head 33, thereby raising the piston 32 against the yieldable downward force exerted by spring 39. As is indicated by the positions of the parts shown in dotted lines in FIG. 2, it is not necessary that the throw of cam 43 by great enough to raise the piston 32 over its full stroke so as to move ball valve 21 to its full open position as long as it is sufficient to partially open the valve, because under such conditions the engine is not fully loaded.

In order to return the cam 43 automatically to the position indicated in full lines in FIG. 2, wherein it establishes the valve-closed position of piston 32, the camshaft 44 is surrounded by a torsion spring 52 having one end anchored to a pin 53 which is fixed to and projects axially outwardly from the valve housing 11, while the other end is hooked around the handle 50 as shown at 54. The ends of the spring 52 are so disposed and the spring is coiled in such a direction that rotation of shaft 44 in a clockwise direction tightens the spring. Consequently, after shaft 44 has been rotated by handle 50 clockwise through 180° from the position shown in FIG. 1, the spring 52 is so loaded that, as soon as the oil pressure in chamber 14 becomes high enough to raise pistonhead 33 out of contact with the flattened high part of cam 43, the spring 52 automatically rotates the shaft 44 in a counterclockwise direction so as to return the cam 43 to its normal position. In this connection, it will be understood that, as long as the force exerted by the spring 39 on the piston 32 exceeds that exerted on piston head 33 by the oil pressure in chamber 14, the friction between the lower face of the pistonhead and the high part of the cam is sufficient to prevent rotation of shaft 44 and the cam under the influence of torsion spring 52.

The rotational movement of cam 43 and shaft 44 is limited to the desired angle of 180° by means of a limit pin 55 which is fixed to and projects transversely from shaft 44. The pin 55 is so located that, when the cam 43 is in its normal position, pin 55 abuts a lower stop pin 56 which projects radially from valve body 11 in substantial vertical alignment with the spring anchor pin 53. To raise the piston by means of the cam, it is only necessary to rotate shaft 44 until limit pin 55 comes into engagement with the pin 53 which thus also serves as an upper stop pin.

As explained in U.S. Pat No. 3,202,143, the Heat Sentinel associated with the above-described Oil Sentinel includes a spring-loaded ball valve which normally prevents the flow of oil from the Oil Sentinel to the Heat Sentinel through conduit 49 of FIGS. 1 and 2, through the Heat Sentinel and back to the oil sump of the engine block. When the temperature of the coolant rises to a predetermined value, a thermal-sensing element causes the Heat Sentinel valve to open, thereby permitting oil to flow from the Oil Sentinel through the Heat Sentinel and back to the engine sump. Due to the presence of the restricted orifice fitting 35 in the oil inlet port 34 of the Oil Sentinel, opening of the Heat Sentinel valve causes an immediate and substantial drop in the pressure of the oil in chamber 14 of the Oil Sentinel, which in turn results in closure of the fuel valve 21, thereby cutting off the normal flow of fuel to the engine, as previously described.

When the Oil Sentinel is used alone, in a system which does not include a Heat Sentinel, oil outlet port 48 is closed by either a plug or a normally closed petcock in place of the fitting on the end of oil outlet line 49.

As thus far described, the construction and mode of operation of the Oil Sentinel shown in FIGS. 1 and 2 are identical with those of the Oil Sentinel of U.S. Pat. No. 3,202,143. The improvement provided by the present invention will now be described with particular reference to FIG. 3.

As shown, the body 11 of the Oil Sentinel is provided with a vertical bore or passageway 101 which is parallel to and offset from the axis of the fuel intake and valve chamber 19 and fuel output chamber 24, and extends from the space 102, at the bottom of the enlarged counterbore into which cap 17 is threaded, downwardly to a point in substantially the same horizontal plane as the axis of the fuel outlet port 25. At this point the lower end of passageway 101 joins a horizontal bore or passageway 103 which opens into fuel output chamber 24 and extends outwardly to the surface of body 11. As indicated in FIGS. 1 and 2, passageways 101 and 103 lie in a vertical plane which is perpendicular to the plane wherein inlet and outlet ports 23 and 25 are located. The outer end of passageway 103 is internally threaded and normally closed by a capscrew 104 which is provided with a suitable sealing element 105, such as an O-ring seal. It will be understood that passageways 101 and 103 are of substantially smaller cross-sectional area than the orifice through which fuel normally flows from chamber 19 to chamber 24 when valve 21 is open. For example, with a valve seat 20 having a diameter of 0.437 inch and a piston end portion 31 having a diameter of 7/32 inch, passageways 101 and 103 may have diameters of ⅛ inch and 3/32 inch, respectively.

With this construction, it is evident that fuel may flow from input chamber 19 through space 102, passageway 101 and the inner end of passageway 103 into output chamber 24 so as to bypass ball valve 21 when the latter is in closed position on its seat 20, and thereby provide a limited flow of fuel to the engine through outlet port 25 and conduit 29, even though an abnormal pressure or coolant temperature condition has caused valve 21 to automatically close.

In order that the flow of fuel through the bypass passageways 101 and 103 may be adjusted so as to regulate the throttled or idling speed of the engine when valve 21 is closed, the internally threaded portion of passageway 103 outboard of the junction with passageway 101 is provided with a cone pointed Allen setscrew 106, the conical end of which extends into the junction between the two passageways and restricts the effective cross-sectional area of the orifice through which fuel may pass from passageway 101 into passageway 103 and thence into fuel output chamber 24.

Although, in the illustrated embodiment of the invention, the upper end of passageway 101 opens into, and receives fuel from chamber 19 via, space 102, it is obvious that, if desired, passageway 101 could communicate directly with chamber 19, as by means of a short bore extending horizontally inward through the wall of chamber 19 in substantially the same plane as fuel inlet port 23.

It will also be evident that the Oil Sentinel herein disclosed could be used to effect an automatic full shutdown of the engine in the same manner as the device of U.S. Pat. No. 3,202,143 by simply so adjusting setscrew 106 that it completely closes communication between passageways 101 and 103.

There is thus provided by the present invention an improved device for controlling the supply of fuel to a vehicular internal combustion engine which automatically throttles the engine when abnormal pressure or temperature conditions arise, but does not completely stop the engine, thereby enabling the operator to retain control of the vehicle until such time as he can safely shut down the engine in the normal manner.

I claim:

1. A device for controlling the flow of fuel to an internal combustion engine in response to pressure conditions existing in a pressure-lubricating system of they type comprising a body having a main fuel passageway therein, fuel inlet and outlet ports communicating with said passageway and adapted to be connected to the fuel supply line of the engine, a valve in said passageway controlling the normal flow of fuel between said inlet and outlet ports, pressure-actuated means normally subject to a pressure equal to that of the lubricant in said lubricating system for maintaining said valve in open position as long as the pressure exerted on said means is at least equal to a predetermined value, means operable to close said valve when the pressure exerted on said pressure-actuated means drops below said predetermined value, and manually operable means for opening said valve to permit fuel to flow to the engine when the lubricant pressure exerted on said pressure actuated means is less than said predetermined value, wherein the improvement comprises:

means independent of said manually operable means and operative when said valve closes automatically in response to a drop in pressure of the lubricant in said lubricating system for supplying sufficient fuel to the engine to keep it running at a reduced speed comprising a bypass fuel passageway in said body, bypassing the portion of said main passageway controlled by said valve, through which a limited amount of fuel may flow from the inlet port to the outlet port when said valve is closed, said bypass passageway being open at all times when the engine is running and of substantially smaller cross-sectional area than the orifice through which fuel normally flows between said inlet and outlet ports when the valve is open.

2. A device as claimed in claim 1 including means for varying the amount of fuel which is permitted to flow through said bypass passageway.

3. A device as claimed in claim 1 wherein the main fuel passageway comprises a fuel intake chamber into which fuel is delivered through said fuel inlet port and a fuel output chamber from which fuel flows out through said fuel outlet port, and the main fuel valve controls communication between said intake and output chambers, and wherein said bypass passageway comprises a passageway in said body connecting said fuel intake and output chambers having a vertically extending portion parallel to and offset from the main fuel passageway and having its upper end in communication with said fuel intake chamber and horizontally extending portion opening into said fuel output chamber, and including manually adjustable means for varying the effective cross-sectional area of the orifice through which fuel may pass from the vertical portion to the horizontal portion of said bypass passageway.